June 14, 1938.  O. SLIGER  2,120,653
COUNTER-SHAM
Filed July 1, 1937  2 Sheets—Sheet 1
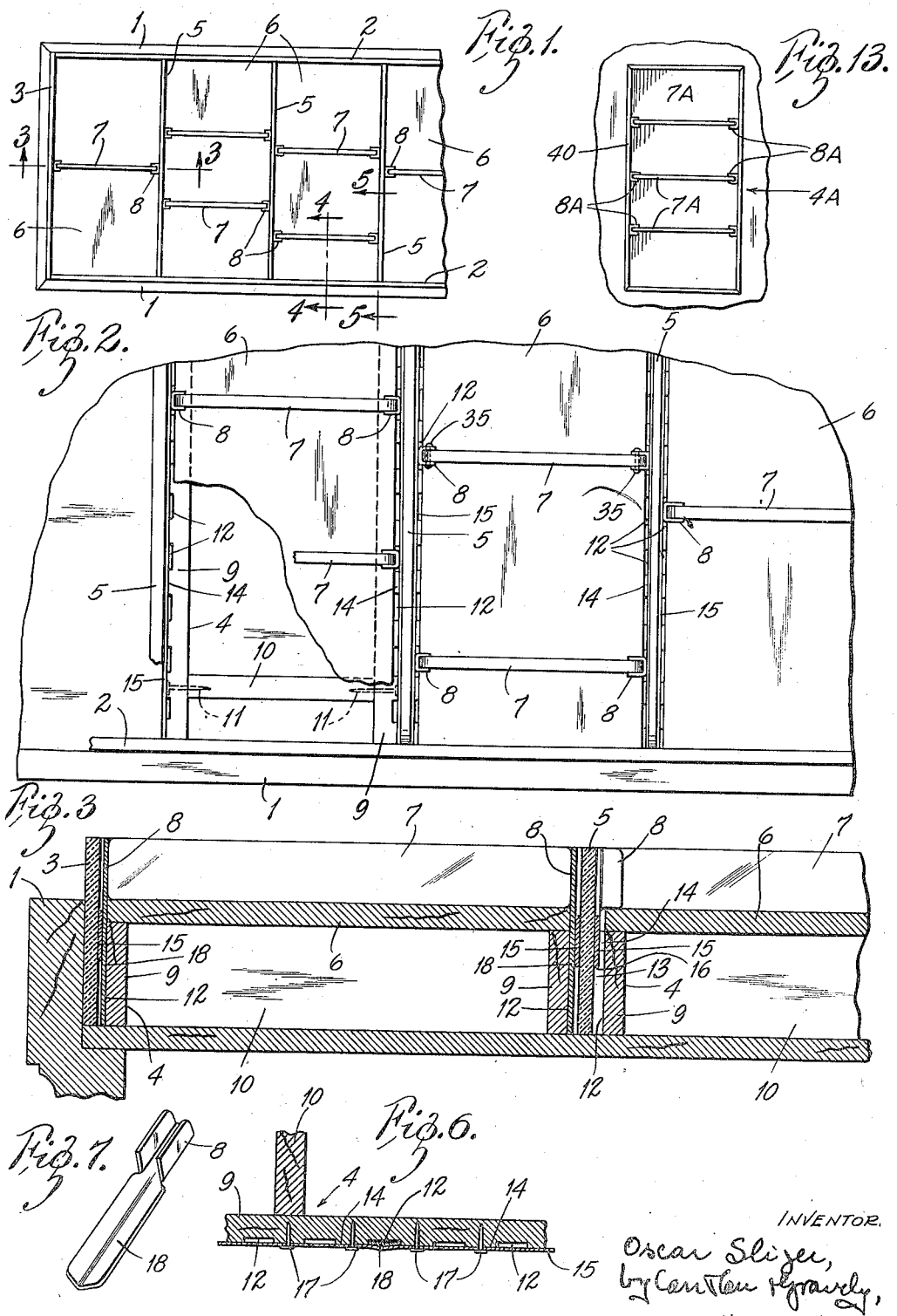
INVENTOR.
Oscar Sliger,
by Cantlen Gravely,
HIS ATTORNEYS.

June 14, 1938.  O. SLIGER  2,120,653
COUNTER-SHAM
Filed July 1, 1937  2 Sheets-Sheet 2
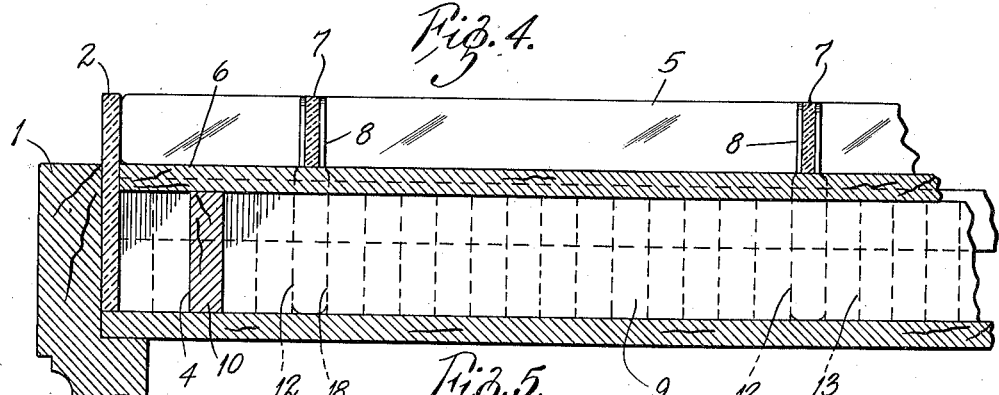
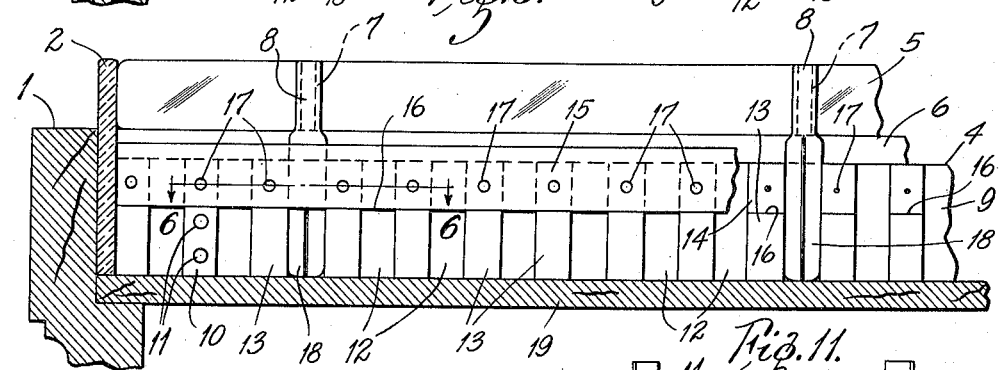
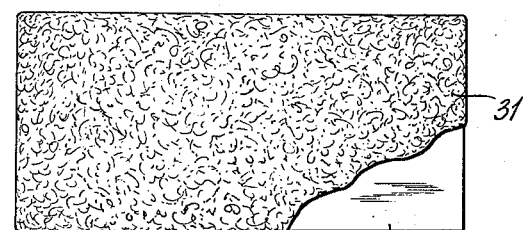
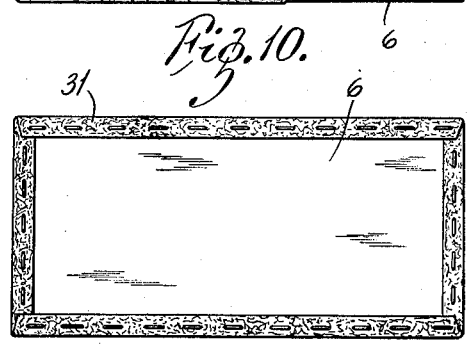
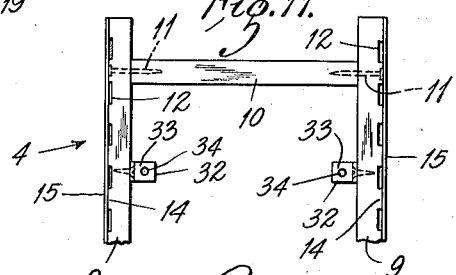
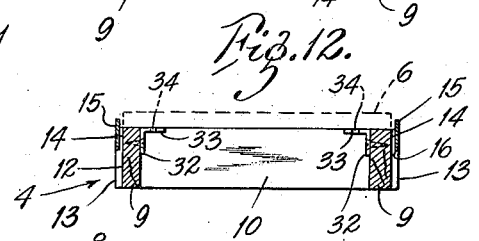
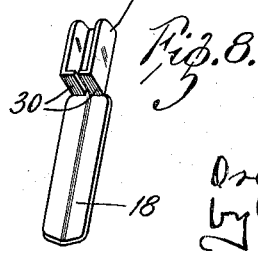
INVENTOR.
Oscar Sliger,
by Canstan Gravely,
HIS ATTORNEYS Patented June 14, 1938

2,120,653

UNITED STATES PATENT OFFICE 2,120,653

COUNTER-SHAM

Oscar Sliger, University City, Mo.

Application July 1, 1937, Serial No. 151,360

8 Claims. (Cl. 312—140)

My invention relates to the display members, commonly called counter-shams, that are placed on the counters or display tables of variety stores and the like. The invention has for its principal object a counter-sham which is easily and quickly mounted on and removed from the counter, which permits easy shifting of the partitions defining individual display compartments, without removing the counter-sham and without disturbing the main partitions, which firmly holds the partitions in place and which can be economically manufactured.

The invention consists in the counter-sham and in the parts and combinations and arrangements of parts hereinafter described and claimed.

In the accompanying drawings,

Fig. 1 is a top plan view of a portion of a counter provided with a plurality of shams embodying my invention, Fig. 2 is a partial top plan view on an enlarged scale, Fig. 3 is a partial sectional view, taken longitudinally of the counter or transversely of a sham, on the line 3—3 in Fig. 1, Fig. 4 is a sectional view on the line 4—4 in Fig. 1, taken transversely of the counter, or longitudinally of an individual sham, Fig. 5 is a sectional view on the line 5—5 of Fig. 1, taken transversely of the counter or along the side margin of an individual sham, Fig. 6 is a sectional view on the line 6—6 of Fig. 5, Fig. 7 is a perspective view of a clip for supporting a partition member, Fig. 8 is a similar view of a modified clip, Fig. 9 is a top plan view of a sham cover, having a covering of felt or the like, Fig. 10 is a bottom plan view of the sham cover of Fig. 9, Fig. 11 is a top plan view of the frame of a sham, showing brackets by which the sham cover may be secured to the frame, Fig. 12 is a cross-sectional view of the frame shown in Fig. 11; and Fig. 13 is an elevation of a modification.

In Fig. 1 is shown a display counter having a marginal retaining wall 1 therearound, marginal walls 2 of glass or other material extending longitudinally of the counter and end walls 3 of glass or other material extending across the ends of the counter, said glass walls 2 and 3 being higher than the retaining walls. Extending transversely of the counter and of a length equal to the width between the glass side walls 2 are shams indicated generally by 4. Partition walls 5 of glass or the like extend transversely of the counter and are held between adjacent shams 4. The shams are provided with cover members 6 and partitions 7 of glass or the like divide up the surface of each sham cover 6 into two or more individual display bins. Clips 8 are provided for positioning the sham partitions 7 at the points desired. The construction thus broadly described is known in the art and my invention is concerned with the specific sham and clip construction as hereinafter described and claimed.

The individual sham frame construction of my invention comprises side rails 9, preferably of a length to extend the full width of the counter between the glass side walls 2 and held together by cross pieces 10 that are secured to the side rails 9 as by nails 11. The outer faces of the rails 9 are provided with a multiplicity of vertical grooves 12, the grooves of the two rails being arranged in transverse alinement. The ribs 13 between the grooves have their upper portions 14 of reduced height, the reduction in height being such that a strip 15 of fiber, metal or other suitable material extending lengthwise of each rail 9 with its lower edge resting against the shoulders 16 formed by the upper ends of the bodies of said ribs 13, has its outer face flush with the bodies of said ribs 13. Said strip 15 is held in place by means of tacks 17 or nails driven into the reduced upper end portions 14 of said ribs 13. The upper edges of said strips 15 project above the tops of said rails 9, thus forming a guide and retaining means for the cover member 6 resting on said rails and making it possible to dispense with means for fastening the cover to said rails.

Each of the sham partitions 7 is supported between the jaws of a pair of said clips 8 arranged in opposed grooves. The stems 18 of said clips extend through the grooves 12 and rest on the top 19 or base of the counter. Said stems are of angular cross-section and thus engage the inner faces of the strips 15 so that the clips are firmly held in the grooves 12, the width of the stems of the clips being the same as the width of the grooves.

As shown in Fig. 8, the clip jaws may have inwardly disposed tongues 30 at their lower edges, so that the sham partitions 7 may be supported on said tongues clear of the cover member 6 of a sham.

As shown in Figs. 9 and 10, the cover member 6 may have a covering 31 of felt or the like secured thereto.

As shown in Figs. 11 and 12, brackets 32 may be secured to the inner faces of the rails with horizontal flange portions 33 disposed flush with the tops of said rails 9. These flanges have holes 34 to accommodate means for securing the cover member 6 in position on the rails 9.

As indicated in Fig. 2, the clips 8 may be secured to the sham partitions 7 by rivets 35 or the like, so that a partition 7 and its two clips 8 may be handled as a unit.

As indicated in Fig. 13, the sham 4A may be enclosed in a suitable frame 40 and mounted vertically, the movable partition members 7A serving as shelves supported by the clips 8A.

The above described construction facilitates the operation of initially positioning and subsequently shifting the sham partitions. At the same time, the clips are firmly held by their frictional and clamping engagement with the walls of the grooves and the strips. In the preferred form, the cover member is easily removable from the frame for cleaning or other purposes without disturbing the frame itself. The cover member may be plain wood or fiber, it may be covered with cloth or other decorative material or it may be of glass or other transparent or translucent material permitting the use of lights beneath the cover member. The upper and lower surfaces of the cover member may be decorated differently, as by applied different materials or painting in different colors. By reversing the cover member, a different decorative effect is easily obtained. Notwithstanding the easy shiftability of the partitions, the construction is such that they are held firmly in desired position. The frame members are simple and easy to construct but are strong enough to withstand very rough usage. The clip of Fig. 8 supports the sham partitions above the cover member, thus preventing the partitions from damaging or marking the cover member and making it possible to shift partitions without leaving marks showing their former positions.

Obviously, numerous changes may be made without departing from the invention and I do not wish to be limited to the precise construction shown.

What I claim is:

1. Means for forming compartments in an article of furniture comprising side rails having opposed grooves in their outer faces separated by ribs, a strip extending lengthwise of the outer face of each rail and disposed edgewise with one edge projecting above the top of the rail, a cover resting on said rails between said strips, clips overhanging said cover and having stems disposed in pairs of opposed grooves and partitions held by said clips.

2. Means for forming compartments in an article of furniture comprising side rails having opposed grooves in their outer faces separated by ribs, a strip extending lengthwise of each rail and disposed edgewise with one edge projecting above the top of the rail, portions of said ribs being of reduced height to position said strips with their outer surfaces flush with the body portions of said ribs, a cover resting on said rails between said strips, clips overhanging said cover and having stems disposed in pairs of opposed grooves and partitions held by said clips.

3. A counter-sham construction comprising side rails having opposed vertical grooves in their outer faces separated by ribs, a strip extending lengthwise of the outer face of each rail and disposed edgewise with its upper edge projecting above the top of the rail, a cover resting on said rails between said strips, clips overhanging said cover and having stems disposed in pairs of opposed grooves and partitions held by said clips.

4. A counter-sham construction comprising side rails having opposed vertical grooves in their outer faces separated by ribs, the upper portions of said ribs being of reduced height, a strip extending lengthwise of each rail and disposed edgewise, with its lower edge against the shoulders formed by the tops of the body portions of said ribs and with its upper edge projecting above the top of the rail, a cover resting on said rails between said strips, clips overhanging said cover and having stems disposed in pairs of opposed grooves and partitions held by said clips.

5. A counter-sham construction comprising side rails having opposed vertical grooves in their outer faces separated by ribs, a strip extending lengthwise of the outer face of each rail and disposed edgewise, with its upper edge projecting above the top of the rail, a cover resting on said rails between said strips, clips overhanging said cover and having stems disposed in pairs of opposed grooves and partitions held by said clips, said stems being a width to fit in said grooves and being of angular section to bind against said strips.

6. A counter-sham construction comprising side rails having opposed vertical grooves in their outer faces separated by ribs, the upper portions of said ribs being of reduced height, a strip extending lengthwise of each rail and disposed edgewise, with its lower edge against the shoulders formed by the tops of the body portions of said ribs and with its upper edge projecting above the top of the rail, a cover resting on said rails between said strips, clips overhanging said cover and having stems disposed in pairs of opposed grooves and partitions held by said clips, said stems being a width to fit in said grooves and being of angular section to bind against said strips.

7. A counter-sham construction comprising side rails having opposed vertical grooves in their outer faces separated by ribs, the upper portions of said ribs being of reduced height, a strip extending lengthwise of each rail and disposed edgewise, with its lower edge against the shoulders formed by the tops of the body portions of said ribs and with its upper edge projecting above the top of the rail, a cover resting on said rails between said strips, clips having stems disposed in pairs of opposed grooves and having jaws at their upper ends, partitions having their ends disposed between jaws of a pair of said clips and means securing said partitions in said jaws whereby a partition and its clips may be handled as a unit.

8. A counter-sham construction comprising side rails having opposed vertical grooves in their outer faces separated by ribs, the upper portions of said ribs being of reduced height, a strip extending lengthwise of each rail and disposed edgewise, with its lower edge against the shoulders formed by the tops of the body portions of said ribs and with its upper edge projecting above the top of the rail, a cover resting on said rails between said strips, clips having stems disposed in pairs of opposed grooves and having jaws at their upper ends, inwardly extending tongues at the lower ends of said jaws and partitions having each end disposed in the jaws of a clip and resting on the tongues thereof.

OSCAR SLIGER.